(12) United States Patent
Yamada et al.

(10) Patent No.: US 7,676,575 B2
(45) Date of Patent: Mar. 9, 2010

(54) METHOD AND DEVICE FOR MANAGING ACCESS TO NETWORK

(75) Inventors: Kazuhiro Yamada, Yokohama (JP); Masaaki Yamamoto, Yokohama (JP); Yoshiaki Hiramatsu, Yokosuka (JP); Kyoko Inoue, Tokyo (JP); Eriko Ooseki, Yokosuka (JP); Motoki Tokuda, Yokosuka (JP); Tatsuro Ooi, Yokohama (JP); Yutaka Sumi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1061 days.

(21) Appl. No.: 10/257,843

(22) PCT Filed: Nov. 8, 2001

(86) PCT No.: PCT/JP01/09779

§ 371 (c)(1), (2), (4) Date: Oct. 17, 2002

(87) PCT Pub. No.: WO02/42920

PCT Pub. Date: May 30, 2002

(65) Prior Publication Data

US 2003/0101264 A1    May 29, 2003

(30) Foreign Application Priority Data

Nov. 22, 2000   (JP)   ............................. 2000-356467

(51) Int. Cl.
*G06F 15/173* (2006.01)

(52) U.S. Cl. .......................................... 709/225; 726/4

(58) Field of Classification Search .................. 709/225, 709/237–238; 455/445; 726/3–4
See application file for complete search history.

(56) References Cited

U.S. PATENT DOCUMENTS

| | | | | |
|---|---|---|---|---|
| 5,825,890 A * | 10/1998 | Elgamal et al. | ............. | 713/151 |
| 5,884,078 A * | 3/1999 | Faustini | ...................... | 719/315 |
| 5,944,783 A * | 8/1999 | Nieten | ........................ | 709/202 |
| 5,987,523 A | 11/1999 | Hind et al. | | |
| 5,987,611 A * | 11/1999 | Freund | ........................... | 726/4 |

(Continued)

FOREIGN PATENT DOCUMENTS

JP    11-45228    2/1999

OTHER PUBLICATIONS

T. Nakamura, "Overview Of Security Function That Protects User From Attack Via The Network," *Nikkei Computer*, Sep. 1998, pp. 180-182. (translation included).

(Continued)

*Primary Examiner*—William C. Vaughn, Jr.
*Assistant Examiner*—Greg Bengzon
(74) *Attorney, Agent, or Firm*—Brinks Hofer Gilson & Lione (57) ABSTRACT

When downloading a Java™ application AP from a server 40, a scheme and a transmission port number used by server 40 when downloading Java™ application AP are stored in addition to a host name of server 40. Then, when the Java™ application AP accesses a resource on the Internet, the host name of a resource to be accessed, and a scheme and a destination port number are compared with the stored host name, scheme, and transmission port number. The network access is permitted only when the compared items agree with each other.

31 Claims, 5 Drawing Sheets

U.S. PATENT DOCUMENTS

| | | | |
|---|---|---|---|
| 6,182,146 B1* | 1/2001 | Graham-Cumming, Jr. | 709/238 |
| 6,304,908 B1* | 10/2001 | Kalajan | 709/229 |
| 6,360,262 B1* | 3/2002 | Guenthner et al. | 709/226 |
| 6,370,569 B1* | 4/2002 | Austin | 709/217 |
| 6,377,808 B1* | 4/2002 | Korneluk et al. | 455/445 |
| 6,418,324 B1* | 7/2002 | Doviak et al. | 455/426.1 |
| 6,523,696 B1* | 2/2003 | Saito et al. | 709/223 |
| 6,530,025 B1* | 3/2003 | Nakagawa et al. | 726/4 |
| 6,587,866 B1* | 7/2003 | Modi et al. | 718/105 |
| 6,606,663 B1* | 8/2003 | Liao et al. | 709/229 |
| 6,628,965 B1* | 9/2003 | LaRosa et al. | 455/557 |
| 6,763,395 B1* | 7/2004 | Austin | 709/245 |
| 6,766,454 B1* | 7/2004 | Riggins | 713/185 |
| 6,857,009 B1* | 2/2005 | Ferreria et al. | 709/219 |
| 6,917,976 B1* | 7/2005 | Slaughter et al. | 709/226 |
| 6,970,869 B1* | 11/2005 | Slaughter et al. | 707/10 |
| 7,139,805 B2* | 11/2006 | Seagren et al. | 709/207 |
| 7,237,261 B1* | 6/2007 | Huber et al. | 726/12 |
| 7,373,422 B1* | 5/2008 | Paul et al. | 709/238 |
| 2002/0049853 A1* | 4/2002 | Chu et al. | 709/237 |
| 2002/0122394 A1* | 9/2002 | Whitmore et al. | 370/328 |
| 2005/0102538 A1* | 5/2005 | Hunt et al. | 713/201 |
| 2006/0218242 A1* | 9/2006 | Tock et al. | 709/217 |

OTHER PUBLICATIONS

"A Distributed Musical Information Processing System on WWW—A Method of Secure Local Communication for Downloaded Java Applets," *14th Conference Proceedings, Japan Society for Software Science and Technology*, Sep. 30, 1997-Oct. 2, 1997, cover and pp. 185-188. (translation included).

"Default Policy Implementation and Policy File Syntax," Java2 SDK, Standard Edition Documentation, Sun Microsystems, Inc., 1998 (pp. 1-12).

Decision in Trial issued Jun. 24, 2008 in Japanese Appeal trial 2006-3455 for patent application No. 2002-545376 (with translation).

"i-Mode Compatible Java Contents Development Guide—Details—Edition 1.0" published by NTT DoCoMo Inc., Gateway Business Division Nov. 8, 2000 11 pages (with partial translation).

* cited by examiner

| APPLICATION IDENTIFICATION NUMBER | URL |
|---|---|
| ap0001 | http://www.abc.co.jp:80 |
| ap0002 | http://www.abc.co.jp:80 |
| ap0035 | ftp://www.abc.co.jp:21 |
| ...... | ...... |
| ...... | ...... |
| ...... | ...... |
| ...... | ...... |
| ...... | ...... |

METHOD AND DEVICE FOR MANAGING ACCESS TO NETWORK

TECHNICAL FIELD

The present invention relates to a method for controlling access to a network by executing software downloaded from a resource on a network, and a device relating to the method.

BACKGROUND ART

A client terminal connected to a network can download various content or applications by accessing a server on the network.

For example, software called "Java™ applet" described in Java™ programming language is designed to be downloaded to the client terminal from a source computer such as a server, and to be executed by a browser provided in the client terminal.

The Java™ applet is a small application with its size being made small so as to reduce the burden on the memory and on the CPU of the client terminal. When executing a process, the applet accesses a server on the network and executes the process in cooperation with the server.

However, an open network such as the Internet is generally not secure, and Java™ applets delivered through such a network are not always be trusted.

Thus, what is required is to preclude network access by an illegal Java™ applet, and, for this purpose, a system for controlling access has been proposed.

In the proposed system, a client terminal is able to access only a server of origin from which a Java™ applet program is downloaded. Specifically, a client terminal stores a host name of the origin server from which a Java™ applet program is downloaded together with identification information of the Java™ applet, and when the Java™ applet accesses the network, access to a server is prohibited if the accessed server does not have a host name that is the same as the one stored and which is correlated with the identification information. This access control method is commonly referred to as a "sand box."

In addition to the Java™ applet mentioned above, there is another software which is described in Java™ programming language and referred to as a "Java™ application." A Java™ application can be downloaded to a client terminal from a server or can be provided in a client terminal in advance, but when it is executed, the application operates in cooperation with software other than a browser, the software having been installed in the client terminal. However, access to the network made by Java™ applications is not an object of the above-mentioned sand box, and thus Java™ applications are able to interact with any server on the network.

A system for network resources adapted to Java™ is likely to be constructed more rapidly in the future, and given such a prospect, some kind of control over network access from Java™ applications needs to be provided.

However, an improper network access is still possible even when the above-mentioned sand box is used for limiting an access from a Java™ application to a server of origin from which the Java application has been downloaded. Specifically, since there are various functions performed by a server, an access might be made to a function of the server that is not intended by a user of a client terminal.

Thus, it is an object of the present invention to enhance security relating to network access by software such as Java™ applications.

DISCLOSURE OF INVENTION

To solve the stated problem, the present invention provides an access control method for controlling access to a network by software which comprises a step of storing, when a client downloads software from a resource on a network, a scheme and a transmission port number used by said resource in addition to a host name of said resource; a step of comparing, when accessing a resource on a network by executing said downloaded software, a host name of a resource to be accessed, and a scheme and a destination port number used for said access, with said stored host name, scheme, and transmission port number; and a step of permitting said access when the compared items agree with each other, while not permitting said access when the compared items do not agree with each other as a result of the comparison. Preferably, said software is a Java™ application that is described in a Java™ programming language and is executed in cooperation with software preinstalled in said client.

Further, the present invention provides a computer program product for causing a computer to implement a process performed in each step of the access-control method mentioned above, and a computer-readable recording medium which has recorded a program for causing a computer to implement the access control method.

The present invention further provides an access control device for controlling access to a network from software, comprising: memory storage means for storing, when a client downloads software from a resource on a network, a scheme and a transmission port number used by said resource in addition to a host name of said resource; comparing means for comparing, when accessing a resource on a network by executing said downloaded software, a host name of a resource to be accessed, and a scheme and a destination port number used for said access, with said stored host name, scheme, and transmission port number; and controlling means for permitting said access when the compared items agree with each other, while not permitting said access when the compared items do not agree with each other as a result of the comparison.

Furthermore, the present invention provides a mobile communications terminal served by a mobile communications network, said mobile communications terminal performing data communications through the network, comprising: downloading means for downloading software from a given resource through said mobile communications network; memory storage means for storing a scheme and a transmission port number used when downloading said software in addition to a host name of said resource; comparing means for comparing, when accessing a resource on a network by executing said downloaded software, a host name of a resource to be accessed, and a scheme and a destination port number used for said access, with said stored host name, scheme, and transmission port number; and controlling means for permitting said access when the compared items agree with each other, while not permitting said access when the compared items do not agree with each other as a result of the comparison.

According to the present invention, a scheme and a transmission port number used by a resource when downloading software from the resource on the network in addition to the host name of the resource are stored and compared with the host name of a resource to be accessed, and a scheme and a destination port number when accessing a resource on the network. Access is permitted only when the compared items agree with each other. As a result, a resource that can be accessed is limited, and security is enhanced.

BEST MODE FOR CARRYING OUT THE INVENTION

An embodiment of the present invention will now be described below with reference to the drawings. In this embodiment, a mobile phone for performing data communications wirelessly will be used for explanation as an example of a client terminal. However, it is to be noted that the present invention is not limited to the embodiment described, and is susceptible to a variety of changes within the scope of its technical idea.

A: Configuration

First, the configuration of the embodiment will be explained.

(1) Configuration of Overall System

Figure 1:
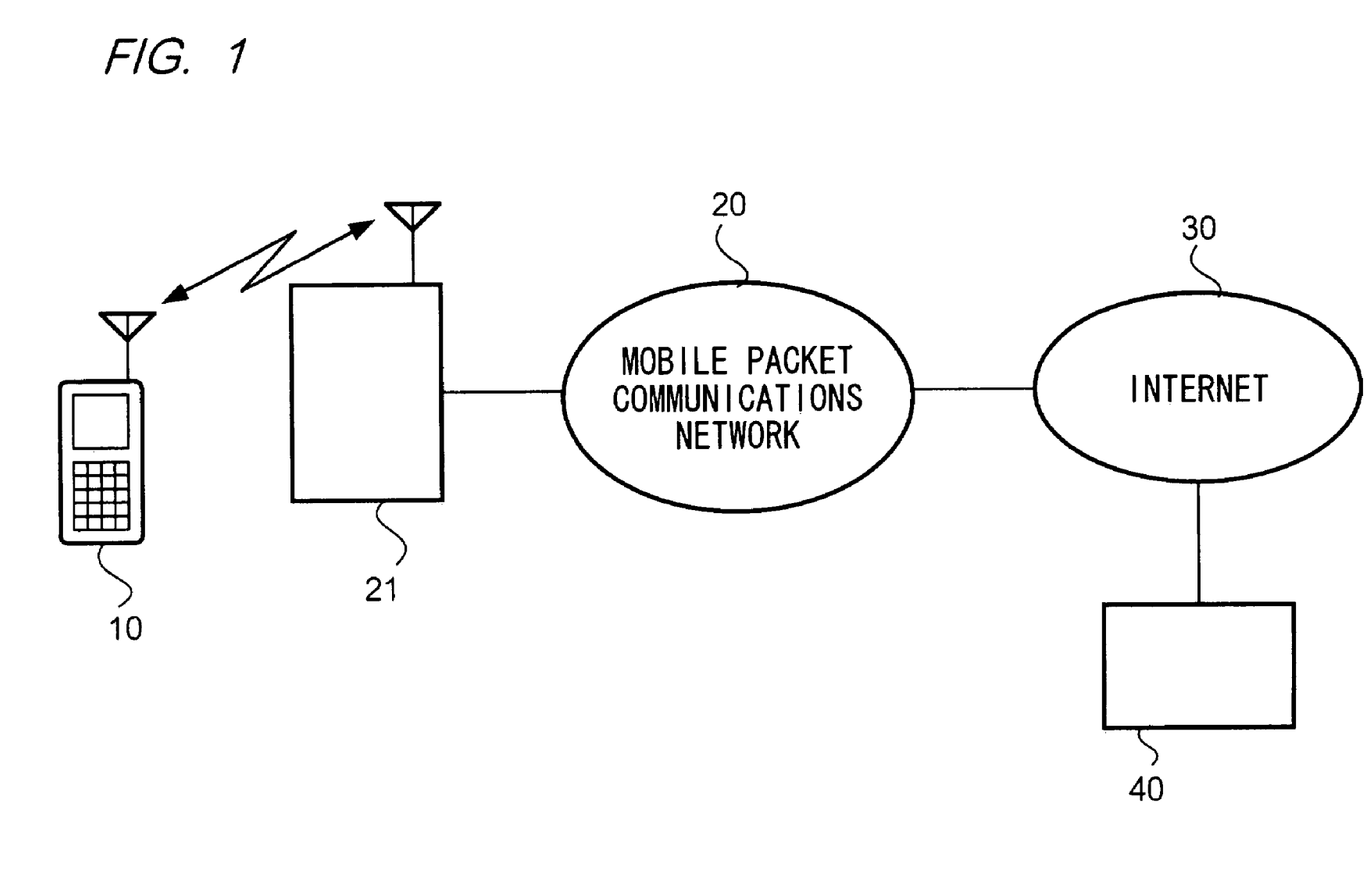
FIG. 1 is a block diagram showing an overall configuration of a system according to an embodiment of the present invention.

FIG. 1 is a block diagram showing a configuration of an overall system according to the present invention. As shown in the figure, the system comprises a mobile phone 10, a mobile packet communications network 20, the Internet 30 and a server 40.

Mobile phone 10 is carried by a user, and the phone 10 receives a communication service of a mobile phone network (not shown). In addition, the phone 10 receives a data communications service of the network 20 by performing wireless communications with base stations 21 of mobile packet communications network 20.

Mobile phone 10 is loaded with a browser for browsing various pages downloaded from the Internet 30 and a Java™ virtual machine which supports Java™, thereby enabling the execution of various types of applications downloaded from server 40.

Mobile packet communications network 20 comprises base stations 21 and not shown switching centers, and a communication line for interconnecting them. A large number of base stations 21 are sited at predetermined intervals within a communication service area and perform wireless communication with mobile phone(s) 10 located in each radio cell.

Mobile packet communications network 20 is connected to the Internet 30 through a gateway (not shown), and bi-directional data relaying can be performed between these networks.

Server 40 stores therein various types of data and software and provides them to mobile phone 10 through the Internet 30 and mobile packet communications network 20.

For example, server 40 stores data in a HTML (Hypertext Markup Language) format that can be viewed using a browser installed in mobile station 10 as well as a Java™ application described in the Java™ programming language. The Java™ application may be, for example, software for controlling online trading such as stock trading, or software for managing a user's address book or PIM (Personal Information Manager). The Java™ application is intended to be executed in mobile phone 10 in cooperation with server 40 after being downloaded from server 40 to mobile phone 10.

(2) Hardware Configuration of Mobile Phone 10

Figure 2:
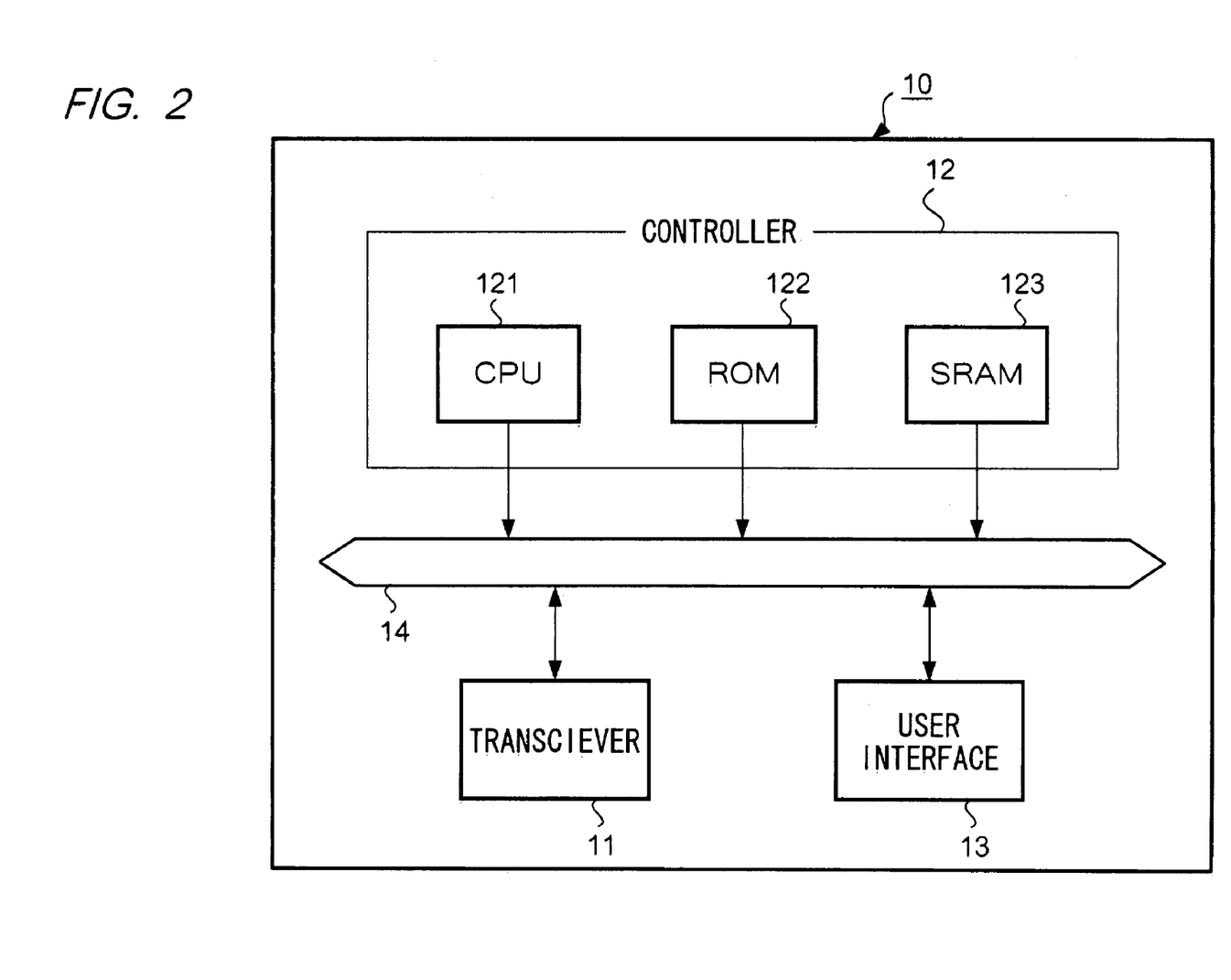
FIG. 2 is a block diagram showing a hardware configuration of a mobile phone according to the embodiment.

Next, the hardware configuration of mobile phone 10 will be explained with reference to the block diagram shown in FIG. 2.

As shown in the figure, mobile phone 10 comprises a transceiver 11, a controller 12, a user interface 13 or a bus 14 for interconnecting them.

Transceiver 11 comprises an antenna or a communication controlling circuit (not shown), and performs wireless communications with base stations 21 of mobile packet communications network 21.

User interface 13 comprises a liquid crystal display for displaying a variety of information, a keypad by which a user performs various input operations, a microphone or a speaker by which a user performs voice communications.

Controller 12 controls each part of mobile phone 10 and is comprised of CPU 121, ROM 122, and SRAM 123.

Various control programs and other programs are stored in ROM 122, and CPU 121 reads out a control program and performs various control processes. The control programs in ROM 122 include a browser and various types of software programs described below in addition to an operating system provided in mobile phone 10.

SRAM 123 caches data of pages provided from server 40 and stores Java™ applications downloaded from server 40.

(3) Software Configuration of Mobile Phone 10

Next, the configuration of software stored in ROM122 of mobile phone 10 will be explained.

Figure 3:
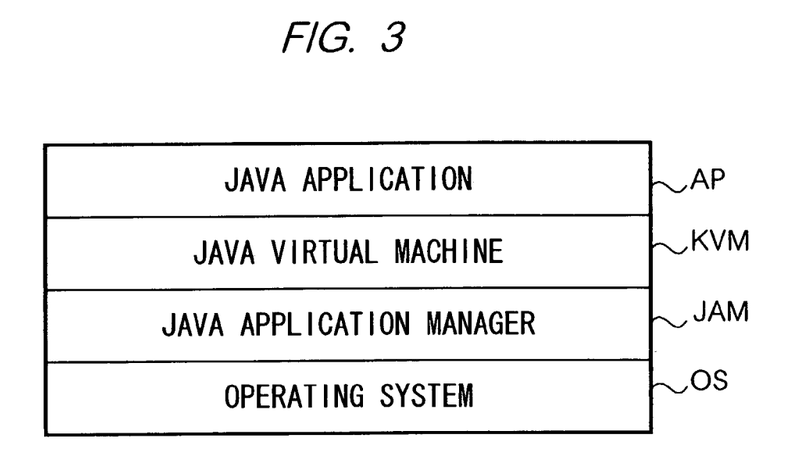
FIG. 3 is a schematic diagram showing a software configuration of a mobile phone according to the embodiment.

FIG. 3 is a schematic diagram showing a software configuration of mobile phone 10. As shown in the figure, the software of mobile phone 10 comprises an operating system OS, a Java™ application manager JAM, a Java™ virtual machine KVM, a Java™ application AP in the order from the bottom to top layer.

Operating system OS is software implemented in well-known mobile phones and supports basic processes of mobile phone 10.

Java™ application manager JAM mainly performs controlling operations of Java™ virtual machine KVM and security check operations. For example, Java™ application manager JAM determines whether to permit access when Java™ application AP accesses a specific resource. For the purpose of the determining operation, Java™ application manager JAM is provided with an access control table described below.

Java™ virtual machine KVM executes a Java™ application under the control of Java™ application manager JAM. Java™ virtual machine KVM and Java™ application manager JAM are preinstalled in operating system OS, and stored in ROM 122.

Java™ application AP is software described in the Java™ programming language. The application AP is downloaded to mobile phone 10 from server 40 and then written in SRAM 123 for storage.

(4) Configuration of Access Control Table

Figure 4:
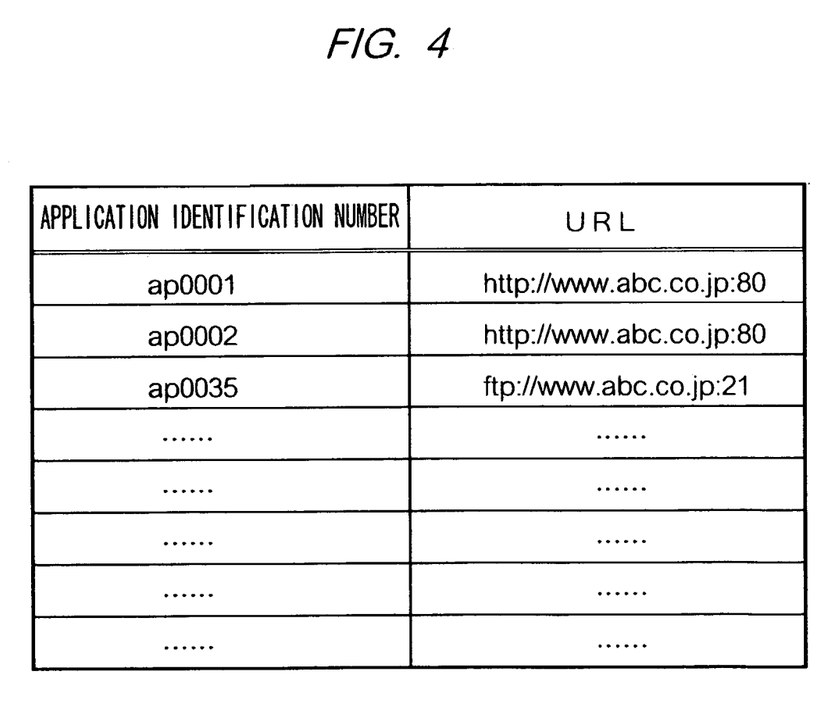
FIG. 4 is a diagram showing an example of contents registered in an access control table provided in the mobile phone according to the embodiment.

FIG. 4 is a format diagram showing an example of memory contents of an access control table provided in Java™ application manager JAM. It is to be noted that the access control table is provided in SRAM 123.

As shown in the figure, Uniform Resource Locators (URLs) of servers 40 are stored in the access control table, each being correlated with an application identification number of each Java™ application AP, where each server 40 is a server of origin from which each Java™ application AP has been downloaded. The URL includes not only a host name but also a scheme and a port number of server 40. It is to be noted here that the scheme refers to a type of protocol used by mobile phone 10 when communicating with server 40; examples include Hypertext Transfer Protocol (http) and File Transfer Protocol (ftp). It is also to be noted that the port number refers to a transmission port number used by server 40 when transmitting Java™ application AP to mobile phone 10. The port number includes a Well-Known port number prescribed by RFC1700 for each application and a port number that is dynamically determined each time.

In FIG. 4, for example, URL "http://www.abc.co.jp:80" is stored in correspondence with an application information number "ap0001". This means that a Java™ application AP designated by the application identification number "ap0001" has been downloaded from a server 40 with its host name "www.abc.co.jp" through the port number "80" and the scheme "http".

As described above, when Java™ application AP accesses a specific resource, Java™ application manager JAM determines whether to permit the access by referring to the access control table.

Specifically, Java™ application manager JAM, when Java™ application AP accesses a resource on the Internet 30, permits access only to a URL stored in the access control table which is correlated with the application identification information of Java™ application AP.

B: Operation

Next, an operation of the embodiment with the above configuration will be described.

The following description will be given in two parts: (1) a download process of a Java™ application; and (2) an executing process of a Java™ application.

(1) Downloading Process of Java™ Application

Figure 5:
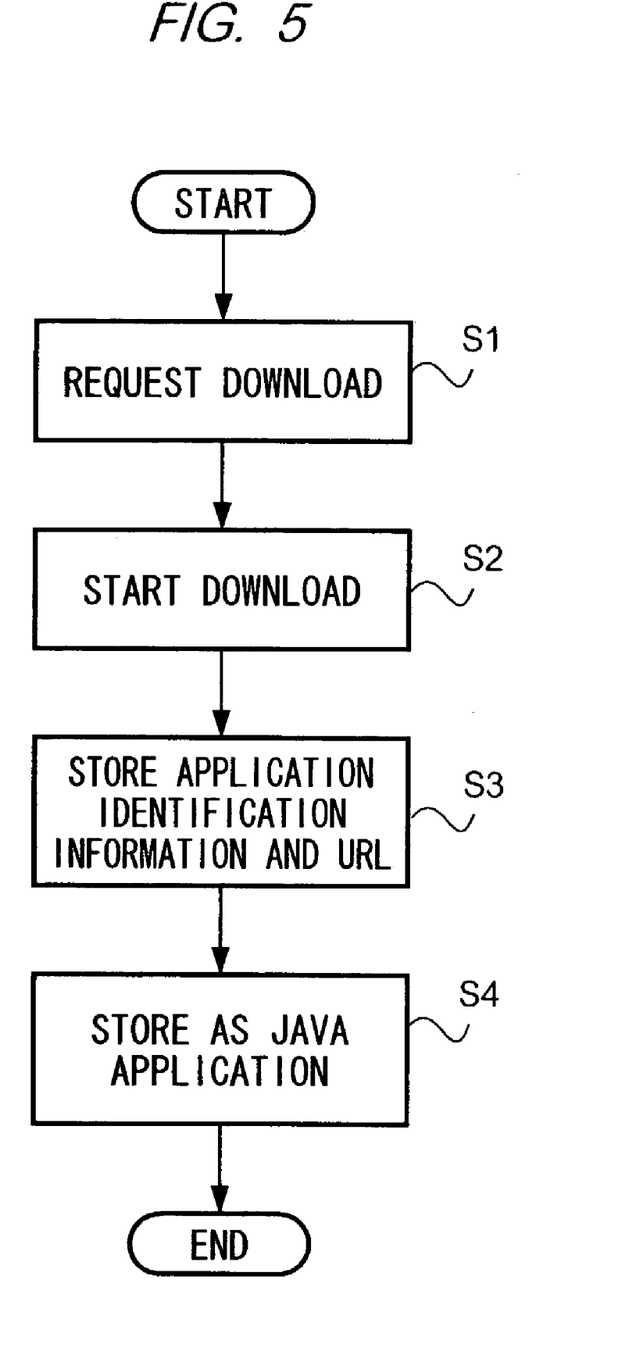
FIG. 5 is a flow chart showing a procedure by which the mobile phone downloads a Java™ application according to the embodiment.

FIG. 5 is a flow cart showing a download process of Java™ application AP by mobile phone 10.

In the figure, mobile phone 10 transmits a download request to server 40 in order to download a Java™ application desired (step S1). Specifically, mobile phone 10 first displays a HTML-format menu page prepared by server 40 on a liquid crystal display of the phone. A user selects from the menu the name of a Java™ application which is desired to be used. A download request is then made by transmitting a request for Java™ application AP from mobile phone 10 to server 40.

Server 40 responds to the download request, and the downloading process of the Java™ application performed by mobile phone 10 is initiated (step S2). Specifically, after the application identification information of Java™ application AP and URL of server 40 are notified to mobile phone 10, the body of Java™ application AP is downloaded in a JAR file format.

Mobile phone 10 writes the application identification information and URL notified by server 40 in the access control table mentioned above (step S3), and writes the data of Java™ application AP in a predetermined memory area of SRAM 123 (step S4). After it is confirmed that all the data is written in SRAM 123, the process shown in figure ends.

(2) Executing Process of Java™ Application

Figure 6:
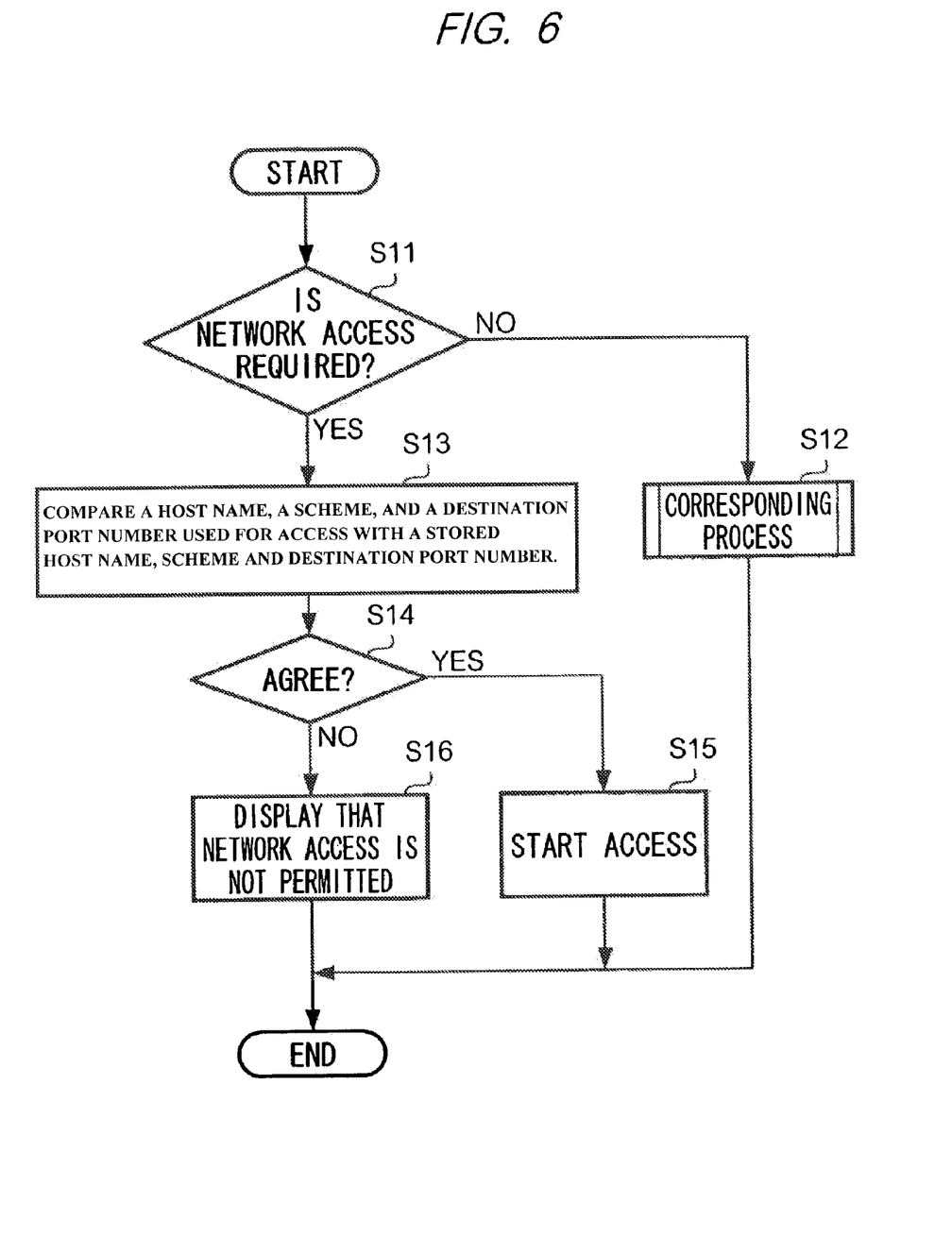
FIG. 6 is a flow chart showing a procedure by which a Java™ virtual machine of the mobile phone executes the downloaded Java™ application according to the embodiment.

FIG. 6 is a flow chart showing an executing process of the Java™ application AP which is executed by Java™ virtual machine KVM of mobile phone 10.

When it is instructed by a user operation to activate a desired Java™ application, Java™ application AP is activated on Java™ virtual machine KVM shown in FIG. 3 in response to the instruction, and the process is performed according to a process-performing unit called a "class".

The operations shown in FIG. 6 are performed in the unit class. In the figure, a determination is first made as to whether a class to be executed is a process requiring access to a resource on the network. (step S11).

In the case that the class does not require network access (step S11; No), Java™ virtual machine KVM performs the process corresponding to the class (step S12), and the process shown in the figure ends.

On the other hand, when the class requires network access (step S11; Yes), Java™ virtual machine KVM compares the host name of the resource to be accessed, and a scheme and a destination port number used for the access with a host name, a scheme, and a port number (transmission port number) (step S13) stored in the access control table in correspondence with the application identification information of the executed Java™ application AP. Specifically, the two host names and schemes, and the destination port number and the port number (transmission port number) are compared with each other.

As a result, when all of the compared items agree with each other (step S14; Yes), Java™ virtual machine KVM permits the network access, and an accessing process by the Java™ application starts (step S15).

On the other hand, when at least one of the compared items does not agree (step S14; No), Java™ virtual machine KVM displays a message on the liquid crystal display that the network access is not permitted (step S16), and the process shown in the figure ends.

In this way, when downloading Java™ application AP from server 40 to mobile phone 10, a scheme and a transmission port number used by server 40 in addition to its host name are stored, and when Java™ application AP accesses a resource on the network, the host name, scheme, and destination port number of a resource to be accessed are compared with the stored host name, scheme, and transmission port number, and the access is permitted only when all of them agree with each other.

In summary, it becomes possible to ensure security by limiting a resource to be accessed in a stricter manner.

C: Modifications

As mentioned, the present invention is not limited to the above embodiment, and various changes are possible such as are outlined in the following.

(1) Mode of Mobile Phone 10

In the embodiment described above, a mobile phone is used as a client terminal but is not limited thereto. Other mobile communications terminals are possible such as Personal Digital Assistants (PDA) with a wireless communication function.

Further, the invention is not limited to a mobile communications terminal and may be a fixed terminal such as a personal computer hard-wired to the Internet 30.

(2) Mode of Server 40

In the embodiment described above, server 40 is provided in the Internet 30, but the present invention is not limited thereto. For example, server 40 may also be provided in mobile packet network 20.

(3) Mode of Programming Languages

Java™ is used in the embodiment described above, but it would be obvious that other programming languages may be used.

(4) An embodiment of the present invention includes a mode of distributing, through telecommunication lines, programs for causing a computer to implement the access control method disclosed in the embodiment mentioned above as well as a mode of distributing such a program product, with the program recorded in a computer-readable recording medium.

The invention claimed is:

1. An access control method for controlling access to a network from software, comprising:
   storing in a memory of a mobile communication device, when the mobile communication device downloads software from a resource on a network, a scheme and a transmission port number used by said resource in addition to a host name of said resource, the scheme showing a type of protocol used by the mobile communication device when communicating with the resource;
   receiving, with the mobile communication device, an instruction to execute said downloaded software;
   determining, by an access control software executed on the mobile communication device, after receiving the instruction to execute said downloaded software but prior to starting access to the resource, whether the downloaded software requests access to the resource, the access control software being separate from the downloaded software;
   comparing, using the access control software executed on the mobile communication device, after receiving the instruction to execute said downloaded software but prior to starting access to the resource on the network, a host name of a resource to be accessed, and a scheme and a destination port number used for said access, with said stored host name, scheme, and transmission port number; and
   permitting said access, by starting access to the resource on the network with the mobile communication device, when the compared items agree with each other, while not permitting said access when the compared items do not agree with each other as a result of the comparison.

2. The access control method as set forth in claim 1, wherein said downloaded software is a Java™ application that is described in a Java™ programming language and is executed in cooperation with a resident software preinstalled in the mobile communication device.

3. A computer-readable recording medium which has recorded a program for causing a computer to implement an access control method for controlling access to a network from software, said computer-readable recording medium comprising:
   a computer readable program instruction for causing a computer to execute a process of storing, when a client downloads software from a resource on a network, a scheme and a transmission port number used by said resource in addition to a host name of said resource, the scheme showing a type of protocol used by the client when communicating with the resource;
   a computer readable program instruction for causing the computer to execute a process of receiving an instruction to execute said downloaded software;
   a computer readable program instruction for causing the computer to execute a process of determining, by an access control software, after receiving the instruction to execute said downloaded software but prior to starting access to the resource, whether the downloaded software requests access to said resource, the access control software being separate from the downloaded software;
   a computer readable program instruction for causing the computer to execute a process of comparing, when executing said downloaded software in order to access the resource on the network and prior to starting access to the resource on the network, a host name of a resource to be accessed, and a scheme and a destination port number used for said access, with said stored host name, scheme, and transmission port number, the scheme showing a type of protocol used by the client when communicating with the resource; and
   a computer readable program instruction for causing the computer to execute a process of permitting said access, by starting access to the resource on the network, when the compared items agree with each other, while not permitting said access when the compared items do not agree with each other as a result of the comparison.

4. An access control device for controlling access to a network from software, comprising:
   memory storage means for storing, when a client download of software from a resource on a network, a scheme and a transmission port number used by said resource in addition to a host name of said resource, scheme showing a type of protocol used by the client when communicating with the resource;
   receiving means for receiving an instruction to execute said downloaded software;
   determining means for determining, by an access control software, after receiving the instruction to execute said downloaded software but prior to starting access to said resource, whether the downloaded software requests access to the resource, the access control software being separate from the downloaded software;
   comparing means for comparing, using the access control software, after receipt of the instruction to execute said downloaded software but prior to starting access to the resource on the network, a host name of a resource to be accessed, and a scheme and a destination port number used for said access, with said stored host name, scheme, and transmission port number to determine whether there is a match; and
   controlling means for permitting said access, by starting access to the resource on the network, when the compared items agree with each other, while not permitting said access when the compared items do not agree with each other as a result of the comparison.

5. A mobile communications terminal served by a mobile communications network, said mobile communications terminal performing data communications through said mobile communications network, comprising
   downloading means for downloading software from a given resource through said mobile communications network;
   memory storage means for storing a scheme and a transmission port number used when downloading said software in addition to a host name of said given resource, scheme showing a type of protocol used by the client when communicating with the resource;

receiving means for receiving an instruction to execute said software;

determining means for determining, by an access control software, after receiving the instruction to execute said downloaded software but prior to starting access to a resource, whether the downloaded software requests access to the resource, the access control software being separate from the downloaded software;

comparing means for comparing, using the access control software, after receiving the instruction to execute said downloaded software but prior to starting access to the resource on the network, a host name of a resource to be accessed, and a scheme and a destination port number used for said access, with said stored host name, scheme, and transmission port number; and controlling means for permitting said access, by starting access to the resource on the network, when the compared items agree with each other, while not permitting said access when the compared items do not agree with each other as a result of the comparison.

6. The access control method as set forth in claim 1, wherein the scheme comprises a hypertext transfer protocol.

7. The access control method as set forth in claim 1, wherein the scheme comprises a file transfer protocol.

8. The access control method as set forth in claim 2, wherein the transmission port number is prescribed based on the Java™ application.

9. The access control method as set forth in claim 1, wherein the transmission port number is dynamically determined.

10. The access control method as set forth in claim 1, wherein:

said downloaded software is downloaded from a server to the mobile communication device; and the transmission port number is used by the server to download the software to the mobile communication device.

11. The access control device as set forth in claim 4, wherein the scheme comprises a hypertext transfer protocol.

12. The access control device as set forth in claim 4, wherein:

said downloaded software includes a Java™ application that is described in a Java™ programming language; and the transmission port number is prescribed based on the Java™ application.

13. The access control device as set forth in claim 4, wherein:

the client includes a mobile electronic device;

said downloaded software is downloaded from a server to the mobile electronic device; and the transmission port number is used by the server to download said downloaded software to the mobile electronic device.

14. The mobile communications terminal as set forth in claim 5, wherein the scheme comprises a hypertext transfer protocol.

15. The mobile communications terminal as set forth in claim 5, wherein the scheme comprises a file transfer protocol.

16. The mobile communications terminal as set forth in claim 5, wherein the transmission port number is dynamically determined.

17. The mobile communications terminal as set forth in claim 5, wherein:

the software is downloaded from a server to the mobile communications terminal; and wherein the transmission port number is used by the server to download the software to the mobile communications terminal.

18. The access control method as set forth in claim 1, wherein the networked resource comprises a server;

wherein at least a part of said downloaded software comprises a browser;

wherein permitting said downloaded software to commence access of the resource via the network comprises:

executing the at least a part of said downloaded software in order to use the browser; and using the browser, with the mobile communication device, to access the data stored on the server.

19. The access control method as set forth in claim 18, wherein determination, by the access control software of whether the downloaded software requests said access to the resource further comprises:

in response to determination that execution of the downloaded software requires network access, performing said comparing, with the use of the access control software, the host name of the resource to be accessed, and the scheme and the destination port number used for said access, with the stored host name, the stored scheme, and the stored transmission port number.

20. The access control method as set forth in claim 19, wherein the network includes a mobile packet communication network;

wherein the mobile device uses the mobile packet communication network to communicate with the server; and wherein comparing is performed prior to the mobile device sending a communication via the mobile packet communication network for access to the data on the server.

21. The access control device as set forth in claim 4, wherein the networked resource comprises a server;

wherein at least a part of said downloaded software when executed comprises using a browser in order to access data on the server;

wherein the controlling means for permitting said access further comprises a means for executing the at least a part of said downloaded software in order to use the browser to access the data stored on the server; and wherein the comparing means performs the comparison prior to the means for executing the at least a part of said downloaded software in order to use the browser to access the data stored on the server.

22. The access control device as set forth in claim 21, wherein in response to determination that execution of the downloaded software requires network access, the comparing means, using the access control software, performs the comparison of the host name of the resource to be accessed, and the scheme and the destination port number used for said access, with the stored host name, the stored scheme, and the stored transmission port number.

23. The access control device as set forth in claim 22, wherein the client comprises a mobile device;

wherein the network includes a mobile packet communication network;

wherein the mobile device uses the mobile packet communication network to communicate with the server; and wherein the comparing is performed prior to the mobile device sending a communication via the mobile packet communication network for said access to the data on the server.

24. The mobile communications terminal as set forth in claim 5, wherein the resource comprises a server;

wherein at least a part of said downloaded software comprises a browser to access data on the server;

wherein controlling means for permitting access comprises means for executing the at least a part of said downloaded software in order to use the browser to access the data stored on the server; and wherein the comparing means performs the comparison prior to the means for executing the at least a part of said downloaded software in order to use the browser to access the data stored on the server.

25. The mobile communications terminal as set forth in claim 24, wherein in response to determination by the determining means that that execution of the downloaded software requires network access, the comparing means performs the comparison of the host name of the resource to be accessed, and the scheme and the destination port number used for said access, with the stored host name, the stored scheme, and the stored transmission port number.

26. The mobile communications terminal as set forth in claim 25, wherein the network includes a mobile packet communication network;

the mobile communications terminal uses the mobile packet communication network to communicate with the server; and wherein the comparing means performs the comparison prior to the mobile communications terminal sending a communication via the mobile packet communication network for said access to the data on the server.

27. The computer-readable recording medium of claim 3, wherein the determination of whether said downloaded software requests said access to the resource occurs prior to execution of said downloaded software.

28. The access control method as set forth in claim 1, further comprising:

in response to the compared items do not agree with each other as a result of the comparison, displaying on the mobile communication device an indication that said access was not permitted.

29. The computer-readable recording media as set forth in claim 3, further comprising:

a computer readable program instruction for causing the computer to execute a process, displaying, in response to the compared items do not agree with each other as a result of the comparison, on the client an indication that said access was not permitted.

30. The access control device as set forth in claim 4, further comprising:

a display means for, in response to the compared items do not agree with each other as a result of the comparison, displaying, on the client, an indication that said access was not permitted.

31. The mobile communications terminal as set forth in claim 5, further comprising:

a display means for, in response to the compared items do not agree with each other as a result of the comparison, displaying, on the client, an indication that said access was not permitted.

* * * * *

UNITED STATES PATENT AND TRADEMARK OFFICE
CERTIFICATE OF CORRECTION

PATENT NO. : 7,676,575 B2 Page 1 of 1
APPLICATION NO. : 10/257843
DATED : March 9, 2010
INVENTOR(S) : Kazuhiro Yamada et al.

It is certified that error appears in the above-identified patent and that said Letters Patent is hereby corrected as shown below:

In the Claims

In Column 11, line 14, delete the first occurrence of "that" after "means".

Signed and Sealed this

First Day of June, 2010

David J. Kappos
*Director of the United States Patent and Trademark Office*